United States Patent
Tajiri et al.

(10) Patent No.: US 11,873,113 B2
(45) Date of Patent: Jan. 16, 2024

(54) FASTENING STRUCTURE

(71) Applicant: SUBARU CORPORATION, Tokyo (JP)

(72) Inventors: Keisuke Tajiri, Tokyo (JP); Hiroyuki Tsubata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1010 days.

(21) Appl. No.: 16/227,140

(22) Filed: Dec. 20, 2018

(65) Prior Publication Data

US 2019/0217967 A1 Jul. 18, 2019

(30) Foreign Application Priority Data

Jan. 15, 2018 (JP) .................. 2018-004513

(51) Int. Cl.
*B64D 45/02* (2006.01)
*B64D 37/32* (2006.01)
*B29C 70/88* (2006.01)
*F16B 5/00* (2006.01)
*B64C 3/26* (2006.01)
(Continued)

(52) U.S. Cl.
CPC ............ *B64D 45/02* (2013.01); *B29C 70/882* (2013.01); *B64C 3/26* (2013.01); *B64D 37/32* (2013.01); *F16B 1/00* (2013.01); *F16B 5/0004* (2013.01); *F16B 5/04* (2013.01); *F16B 2200/93* (2023.08)

(58) Field of Classification Search
CPC ... B64D 45/02; F16B 1/00; F16B 5/04; F16B 2001/0064
See application file for complete search history.

(56) References Cited

U.S. PATENT DOCUMENTS 3,755,713 A * 8/1973 Paszkowski .......... B29C 70/885
442/13
3,989,984 A 11/1976 Amason et al.
(Continued)

FOREIGN PATENT DOCUMENTS

CA       20907 817 C    10/2014
EP       0 318 839 A2   6/1989
(Continued)

OTHER PUBLICATIONS

Extended European Search Report issued in corresponding European Patent Application No. 18 20 1048.3 dated Apr. 29, 2019.
(Continued)

*Primary Examiner* — Michael H Wang
(74) *Attorney, Agent, or Firm* — TROUTMAN PEPPER HAMILTON SANDERS LLP

(57) ABSTRACT

A fastening structure includes a first structural member, a second structural member, and a fastening member. The first structural member includes a composite material, and has a first electrically-conductive surface having electric conductivity. The second structural member has a second electrically-conductive surface. The second electrically-conductive surface is in contact with the first electrically-conductive surface and has electric conductivity. The fastening member penetrates the first electrically-conductive surface and the second electrically-conductive surface, and fastens the first structural member and the second structural member.

5 Claims, 2 Drawing Sheets

(51) Int. Cl.
  *F16B 1/00* (2006.01)
  *F16B 5/04* (2006.01)

(56) References Cited

U.S. PATENT DOCUMENTS

| | | | | |
|---|---|---|---|---|
| 4,556,591 | A * | 12/1985 | Bannink, Jr. | B29C 66/532 |
| | | | | 428/43 |
| 4,599,255 | A * | 7/1986 | Anglin | B29C 70/885 |
| | | | | 428/116 |
| 4,628,402 | A * | 12/1986 | Covey | B64D 45/02 |
| | | | | 361/218 |
| 4,630,168 | A * | 12/1986 | Hunt | B64D 45/02 |
| | | | | 244/1 A |
| 4,681,497 | A * | 7/1987 | Berecz | F16B 33/004 |
| | | | | 411/908 |
| 4,755,904 | A * | 7/1988 | Brick | B64D 45/02 |
| | | | | 244/1 A |
| 4,888,451 | A * | 12/1989 | Toni | B64D 45/02 |
| | | | | 174/94 R |
| 4,891,732 | A * | 1/1990 | Jones | F16B 37/044 |
| | | | | 361/218 |
| 5,175,665 | A * | 12/1992 | Pegg | B64D 45/02 |
| | | | | 244/1 A |
| 5,461,534 | A * | 10/1995 | Gondot | B64D 45/02 |
| | | | | 174/2 |
| 6,320,118 | B1 * | 11/2001 | Pridham | B29C 65/4855 |
| | | | | 174/2 |
| 8,393,067 | B2 | 3/2013 | Kawamata | |
| 8,393,068 | B2 * | 3/2013 | Keener | B29C 66/21 |
| | | | | 29/525.06 |
| 2005/0103936 | A1 * | 5/2005 | Pridham | B64D 45/02 |
| | | | | 244/119 |
| 2005/0213278 | A1 * | 9/2005 | Hawley | B64D 45/02 |
| | | | | 361/212 |
| 2008/0297967 | A1 * | 12/2008 | Winter | B64D 45/02 |
| | | | | 361/117 |
| 2010/0061031 | A1 * | 3/2010 | Lopez-Reina Torrijos | B29C 70/885 |
| | | | | 361/218 |
| 2010/0320315 | A1 * | 12/2010 | Kashiwagi | F16B 33/004 |
| | | | | 244/1 A |
| 2012/0234977 | A1 * | 9/2012 | Kawahara | F16B 37/14 |
| | | | | 244/131 |
| 2012/0236457 | A1 * | 9/2012 | Yamakoshi | B64D 45/02 |
| | | | | 361/218 |
| 2014/0096991 | A1 | 4/2014 | Kawahara et al. | |
| 2016/0052638 | A1 | 2/2016 | Kamihara et al. | |
| 2016/0229552 | A1 * | 8/2016 | Gross | B29C 66/72141 |
| 2016/0244182 | A1 * | 8/2016 | Kawashima | B64C 1/12 |
| 2016/0297542 | A1 * | 10/2016 | Khosravani | B64D 45/02 |
| 2017/0303376 | A1 * | 10/2017 | Kaste | F16B 33/006 |
| 2018/0170576 | A1 * | 6/2018 | Khosravani | B64D 45/02 |

FOREIGN PATENT DOCUMENTS

| | | |
|---|---|---|
| EP | 2 947 015 A1 | 11/2015 |
| EP | 3 260 377 A1 | 12/2017 |
| EP | 3 153 410 A1 | 4/2019 |
| JP | 2-225200 A | 9/1990 |
| JP | 2012-6528 A | 1/2012 |
| JP | 2012-192752 A | 10/2012 |
| JP | 6139582 B2 | 5/2017 |
| WO | 99/51494 A1 | 10/1999 |
| WO | 2008/140604 A2 | 11/2008 |

OTHER PUBLICATIONS

Notice of Reasons for Refusal issued in corresponding Japanese Patent Application No. 2018-004513 dated Aug. 27, 2019 (with machine translation).

* cited by examiner

FASTENING STRUCTURE

CROSS-REFERENCE TO RELATED APPLICATIONS

The present application claims priority from Japanese Patent Application No. 2018-004513 filed on Jan. 15, 2018, the entire contents of which are hereby incorporated by reference.

BACKGROUND

The technology relates to a fastening structure.

An apparatus such as an aircraft or a vehicle includes a first structural member and a second structural member. The first structural member and the second structural member each include a composite material and are fastened by a fastener. When a current flows across the first structural member and the second structural member due to lightning strike or any other current-generating situation, the current may possibly be concentrated at the fastener, possibly leading to generation of a spark.

To address such a concern, Japanese Patent No. 6139582 discloses a configuration in which an electric conductor is provided separately from the fastener. The electric conductor penetrates one or both of the first structural member and the second structural member, and is in contact with an electrically-conductive layer provided between the first structural member and the second structural member. Such a configuration allows a current, flowing into one of the first structural member and the second structural member, to flow from the electric conductor to the electrically-conductive layer, making it possible to suppress the concentration of the current onto the fastener.

SUMMARY

An aspect of the technology provides a fastening structure that includes: a first structural member including a composite material, and having a first electrically-conductive surface that has electric conductivity; a second structural member having a second electrically-conductive surface, in which the second electrically-conductive surface is in contact with the first electrically-conductive surface and has electric conductivity; and a fastening member penetrating the first electrically-conductive surface and the second electrically-conductive surface, and fastening the first structural member and the second structural member.

DETAILED DESCRIPTION

Figure 1:
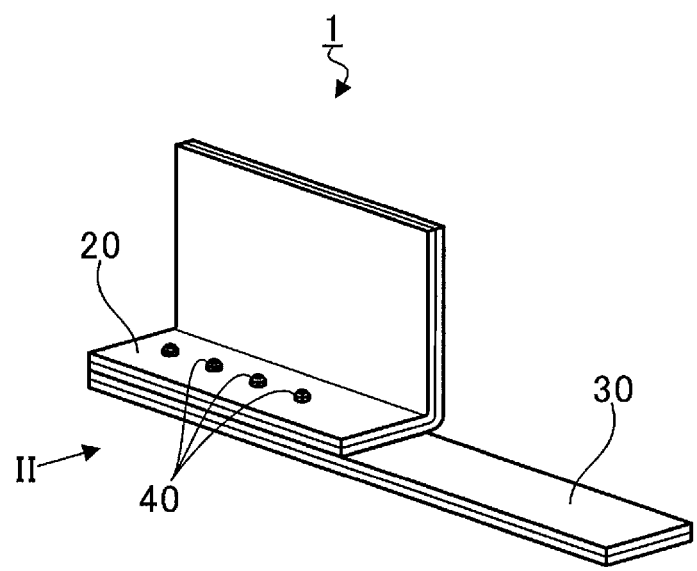
FIG. 1 is a diagram illustrating a fastening structure according to one implementation of the technology.

In the following, some implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

A configuration disclosed in Japanese Patent No. 6139582 involves a difficulty in which it is difficult for a current flowing through respective layers of composite materials to flow in a direction from one layer to another, i.e., in an interlayer direction. Accordingly, there is room for improvement in terms of further suppressing a spark generated as a result of concentration, at a fastener, of a current that has failed to flow to an electrically-conductive layer.

It is desirable to provide a fastening structure that makes it possible to suppress generation of a spark.

FIG. 1 is a diagram illustrating a fastening structure 1 according to an example implementation of the technology. For example, the fastening structure 1 may be used for an aircraft. Referring to FIG. 1, the fastening structure 1 includes a first structural member 20, a second structural member 30, and a fastening member 40. The first structural member 20 and the second structural member 30 each may include a composite material such as, but not limited to, a carbon fiber reinforced plastic. The first structural member 20 and the second structural member 30 may be fastened by the fastening member 40 in a stacked fashion. In the following, a direction in which the first structural member 20 and the second structural member 30 are stacked is simply referred to as a "stack direction".

Figure 2:
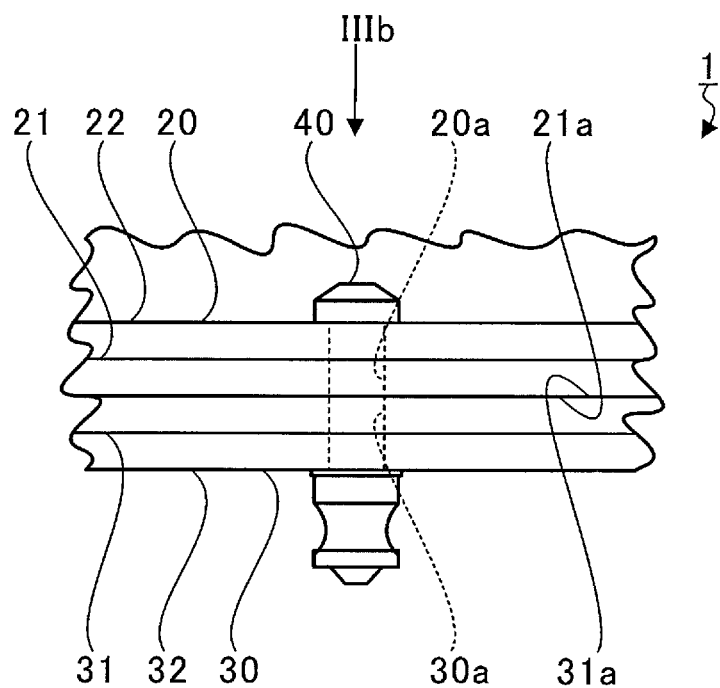
FIG. 2 is a diagram illustrating a part of the fastening structure as seen from a direction of an arrow II illustrated in FIG. I.

FIG. 2 is a diagram illustrating a part of the fastening structure 1 as seen from a direction of an arrow II illustrated in FIG. 1. Referring to FIG. 2, the first structural member 20 may include a first inner layer 21 and a first outer layer 22 that are stacked in the stack direction. The first inner layer 21 may be positioned closer to the second structural member 30 than the first outer layer 22. The first inner layer 21 may have a plane that faces the second structural member 30 and that has a first electrically-conductive surface 21a.

The first inner layer 21 may include an electrically-conductive composite material. Non-limiting examples of the electrically-conductive composite material may include an electrically-conductive polymer, an electrically-conductive resin, a carbon nanotube, and any other composite material having electric conductivity. The first outer layer 22 may include a non-electrically-conductive composite material.

The first inner layer 21 and the first outer layer 22 each may include a plurality of layers that are stacked in the stack direction. In an alternative example implementation, the first inner layer 21 and the first outer layer 22 each may include a single layer. The layers structuring the first inner layer 21 and the first outer layer 22 may have fibers that extend in a direction perpendicular to or roughly perpendicular to the stack direction. In the following, the direction perpendicular to or roughly perpendicular to the stack direction is simply referred to as a "plane direction".

The first structural member 20 may have a through hole 20a. The through hole 20a may penetrate the first structural member 20 in the stack direction. For example, the through hole 20a may penetrate, in the stack direction, the first inner layer 21 (including the first electrically-conductive surface 21a) and the first outer layer 22.

The second structural member 30 may include a second inner layer 31 and a second outer layer 32 that are stacked in the stack direction. The second inner layer 31 may be positioned closer to the first structural member 20 than the second outer layer 32. The second inner layer 31 may have a plane that faces the first structural member 20 and that has a second electrically-conductive surface 31a. The second electrically-conductive surface 31a may be in contact with the first electrically-conductive surface 21a. For example, the second electrically-conductive surface 31a may be in surface contact with the first electrically-conductive surface 21a.

The second inner layer 31 may include an electrically-conductive composite material. Non-limiting examples of the electrically-conductive composite material may include an electrically-conductive polymer, an electrically-conductive resin, a carbon nanotube, and any other composite material having electric conductivity. The second outer layer 32 may include a non-electrically-conductive composite material.

The second inner layer 31 and the second outer layer 32 each may include a plurality of layers that are stacked in the stack direction. In an alternative example implementation, the second inner layer 31 and the second outer layer 32 each may include a single layer. The layers structuring the second inner layer 31 and the second outer layer 32 may have fibers that extend in the plane direction.

The second structural member 30 may have a through hole 30a. The through hole 30a may penetrate the second structural member 30 in the stack direction. For example, the through hole 30a may penetrate, in the stack direction, the second inner layer 31 (including the second electrically-conductive surface 31a) and the second outer layer 32.

The fastening member 40 may be a metallic fastener such as, but not limited to, a bolt, a nut, or any other member used for fastening two or more parts. The fastening member 40 may be inserted into the through hole 20a of the first structural member 20 and the through hole 30a of the second structural member 30, and fastens the first structural member 20 and the second structural member 30. The fastening member 40 may penetrate the first electrically-conductive surface 21a and the second electrically-conductive surface 31a.

The fastening member 40 may fasten the first structural member 20 and the second structural member 30 through the through holes 20a and 30a by means of interference fit, transition fit, clearance fit, or any other fitting method that allows for fastening of the first structural member 20 and the second structural member 30.

Figure 3A:
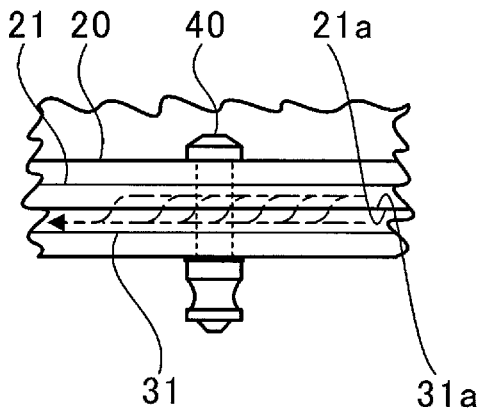
FIGS. 3A to 3D are diagrams each illustrating a current flow.
Figure 3B:
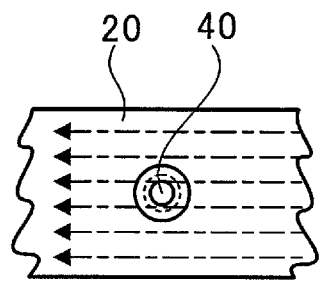
Figure 3C:
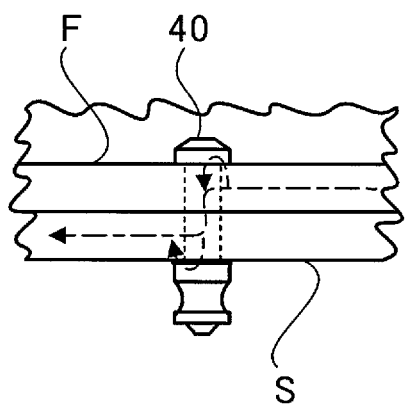
Figure 3D:
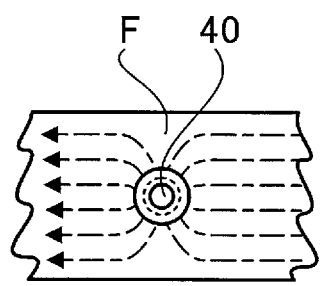

FIGS. 3A to 3D are diagrams illustrating current flows, in each of which a chain line arrow represents a corresponding current flow. FIG. 3A illustrates the part of the fastening structure 1 as seen from the same direction as FIG. 2. FIG. 3B illustrates the part of the fastening structure 1 as seen from a direction of an arrow IIIb illustrated in FIG. 2. FIGS. 3C and 3D illustrate the current flows according to a comparative example.

Referring to FIGS. 3C and 3D, a first structural member F and a second structural member S in the comparative example each include no electrically-conductive composite material. Accordingly, the current, flowing through the first structural member F due to lightning strike or any other current-generating situation, is concentrated at the fastening member 40 without flowing in the interlayer direction as illustrated in FIGS. 3C and 3D, possibly leading to generation of a spark.

In contrast, the fastening structure according to the example implementation may include the first inner layer 21 and the second inner layer 31 each including the electrically-conductive composite material. Thus, in the first structural member 20, the current may mainly flow within the first inner layer 21 as illustrated in FIGS. 3A and 3B. Such a current may thereafter flow to the second inner layer 31 through the first electrically-conductive surface 21a and the second electrically-conductive surface 31a while being less concentrated at the fastening member 40, and may be diffused from the second inner layer 31 to the outside. Hence, it is possible to suppress the concentration of the current onto the fastening member 40, and suppress the generation of the spark accordingly.

Figure 4:
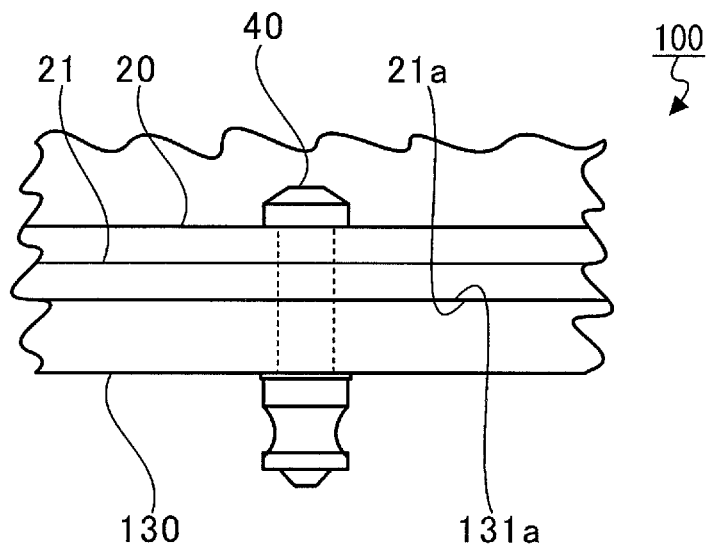
FIG. 4 is a diagram illustrating a part of a fastening structure according to a modification example.

FIG. 4 is a diagram illustrating a part of a fastening structure 100 according to a modification example. Referring to FIG. 4, the fastening structure 100 may have a second structural member 130 that includes a metal instead of the composite material. The second structural member 130 may have a plane that faces the first structural member 20 and that has a second electrically-conductive surface 131a. The second electrically-conductive surface 131a may be in contact with the first electrically-conductive surface 21a.

With such a configuration according to the modification example, the current may mainly flow in the first structural member 20 within the first inner layer 21, and may thereafter flow to the second structural member 130 through the first electrically-conductive surface 21a and the second electrically-conductive surface 131a while being less concentrated at the fastening member 40, as with the foregoing example implementation. The second structural member 130 includes any metal, allowing for easier flow of the current. Hence, it is possible to suppress the concentration of the current onto the fastening member 40, and suppress the generation of the spark accordingly.

Note that the current flows from the first structural member 20 to the second structural member 30 or 130 in the foregoing example implementation and the modification example. The same working and effects are also achieved as well when the current flows from the second structural member 30 or 130 to the first structural member 20 in the foregoing example implementation and the modification example.

Although some implementations of the technology have been described in the foregoing by way of example with reference to the accompanying drawings, the technology is by no means limited to the example implementations described above.

For example, the fastening structure 1 or 100 may be used for the aircraft in the foregoing example implementation and the modification example. In an alternative example implementation, however, the fastening structure 1 or 100 may be used for an apparatus other than the aircraft, such as a vehicle. The fastening structure 1 or 100 may be provided near or inside a location or a device which is susceptible to the spark, especially in an example implementation where the fastening structure 1 or 100 is applied to the aircraft. Non-limiting examples of such a location or a device may include a fuel tank, a cabin, and an electrical component.

The fastening member 40 may be the metallic fastener in the foregoing example implementation and the modification example. In an alternative example implementation, however, the fastening member 40 may include an insulator.

The first structural member 20 may include the first inner layer 21 and the first outer layer in the foregoing example implementation and the modification example. Providing the first outer layer 22 reduces use of the electrically-conductive composite material which is often more expensive than the non-electrically-conductive composite material and thus makes it possible to reduce costs. The first outer layer 22, however, is not necessarily an essential feature. In an alternative example implementation, the first structural member 20 as a whole may be the first inner layer 21 that includes the electrically-conductive composite material.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A fastening structure comprising:
   a first structural member including a first carbon fiber reinforced plastic inner layer and a first non-electrically-conductive composite material outer layer stacked on the first carbon fiber reinforced plastic inner layer in a first direction, the first carbon fiber reinforced plastic inner layer including carbon fibers extended in a second direction substantially perpendicular to the first direction, the first non-electrically-conductive composite material outer layer including fibers extended in a third direction substantially perpendicular to the first direction;
   a second structural member having a second inner surface, the second inner surface being in direct surface contact with a first inner surface of the first carbon fiber reinforced plastic inner layer facing the first direction, such that the second inner surface and the first non-electrically-conductive composite material outer layer sandwich the first carbon fiber reinforced plastic inner layer in the first direction, the second inner surface having electric conductivity; and
   a fastening member penetrating the first inner surface and the second inner surface along the first direction, and fastening the first structural member and the second structural member,
   wherein the first carbon fiber reinforced plastic inner layer includes an electrically-conductive polymer, an electrically-conductive resin or a carbon nanotube so that a conductivity of the first carbon fiber reinforced plastic inner layer in the first direction is higher than a conductivity of the first non-electrically-conductive composite material outer layer in the first direction.

2. The fastening structure according to claim 1, wherein the second inner surface includes a metal.

3. The fastening structure according to claim 1, wherein the second structural member includes a second carbon fiber reinforced plastic inner layer and a second non-electrically-conductive composite material outer layer stacked on the second carbon fiber reinforced plastic inner layer in the first direction, the second carbon fiber reinforced plastic inner layer includes carbon fibers extended in a fourth direction substantially perpendicular to the first direction, the second non-electrically-conductive composite material outer layer includes fibers extended in a fifth direction substantially perpendicular to the first direction,
   wherein the second carbon fiber reinforced plastic inner layer includes an electrically-conductive polymer, an electrically-conductive resin or a carbon nanotube so that a conductivity of the second carbon fiber reinforced plastic inner layer in the first direction is higher than a conductivity of the second non-electrically-conductive composite material outer layer in the first direction, and
   wherein second carbon fiber reinforced plastic inner layer has the second surface.

4. The fastening structure according to claim 3, wherein the fastening member is made of insulator.

5. A fastening structure comprising:
   a first structural member including a first inner layer and a first outer layer stacked on the first inner layer in a first direction, the first inner layer consisting of a carbon fiber reinforced plastic that includes an electrically-conductive polymer, an electrically-conductive resin or a carbon nanotube, the first outer layer consisting of a non-electrically-conductive composite material, the first inner layer including a first electrically-conductive surface;
   a second structural member including a second inner layer and a second outer layer stacked on the second inner layer in the first direction, the second inner layer consisting of a carbon fiber reinforced plastic that includes an electrically-conductive polymer, an electrically-conductive resin or a carbon nanotube, the second outer layer consisting of a non-electrically-conductive composite material, the second inner layer including a second electrically-conductive surface being in direct surface contact with the first electrically conductive surface; and
   a fastening member penetrating the first electrically-conductive surface and the second electrically-conductive surface along the first direction, and fastening the first structural member and the second structural member,
   wherein the second inner layer and the first outer layer sandwich the first inner layer in the first direction.

* * * * *